(12) United States Patent
Courtney et al.

(10) Patent No.: US 11,054,342 B2
(45) Date of Patent: Jul. 6, 2021

(54) SYSTEM FOR ABNORMAL CONDITION DETECTION USING NEAREST NEIGHBOR

(71) Applicant: LIFEWHERE, LLC, Warrendale, PA (US)

(72) Inventors: Brian Scott Courtney, Austin, TX (US); James Henry Gillespie, V, Sewickley, PA (US); Alan Glenn Hinchman, Rock Hill, SC (US); Logan James Krawchyk, Wexford, PA (US)

(73) Assignee: LifeWhere, LLC, Warrendale, PA (US)

( * ) Notice: Subject to any disclaimer, the term of this patent is extended or adjusted under 35 U.S.C. 154(b) by 473 days.

(21) Appl. No.: 15/437,067

(22) Filed: Feb. 20, 2017

(65) Prior Publication Data

US 2018/0238772 A1 Aug. 23, 2018

(51) Int. Cl.
*F04D 15/02* (2006.01)
*G05D 9/12* (2006.01)
(Continued)

(52) U.S. Cl.
CPC ............ *G01M 99/005* (2013.01); *E03F 5/10* (2013.01); *F04D 15/00* (2013.01);
(Continued)

(58) Field of Classification Search
CPC .. G01M 99/005; H04W 4/02; G05D 23/1927; G05D 9/12; G08B 21/00; H04N 21/8126;
(Continued)

(56) References Cited

U.S. PATENT DOCUMENTS

| 6,078,843 | A | * | 6/2000 | Shavit | ................. | G05B 13/027 |
| | | | | | | 700/42 |
| 7,941,306 | B2 | * | 5/2011 | Furem | .................... | E02F 9/267 |
| | | | | | | 703/8 |

(Continued)

FOREIGN PATENT DOCUMENTS

WO    WO-2017173463 A1 * 10/2017 ............. G01L 11/02

OTHER PUBLICATIONS

Hall (D. L. Hall and et al, "An Introduction to Multisensor Data Fusion", Proceedings of the IEEE, vol. 85, No. 1, Jan. 1997) (Year: 1997).*

(Continued)

*Primary Examiner* — Alexander Satanovsky
*Assistant Examiner* — Douglas Kay
(74) *Attorney, Agent, or Firm* — Shumaker & Sieffert, P.A.

(57) ABSTRACT

One embodiment provides a method, including: receiving, from at least one sensor operatively coupled to a mechanical device, sensor data corresponding to a function of the mechanical device; accessing, from an environmental database, information regarding at least one environmental condition in proximity to a geographical location of the mechanical device; generating, using a processor, a correlative value for the mechanical device, wherein the correlative value identifies a correlation between the sensor data corresponding to a function of the mechanical device and the at least one environmental condition; assigning the correlative value as a baseline correlative value to the mechanical device; monitoring the sensor data corresponding to a function of the mechanical device and the at least one environmental condition and updating the correlative value; identifying, using a processor, the correlative value for the mechanical device has exceeded a predetermined threshold
(Continued)

as compared to the baseline correlative value; and notifying a user that the correlative value for the mechanical device has exceeded the predetermined threshold. Other aspects are described and claimed.

18 Claims, 5 Drawing Sheets

(51) Int. Cl.
| | |
|---|---|
| F04D 15/00 | (2006.01) |
| G05D 23/19 | (2006.01) |
| G08B 21/00 | (2006.01) |
| H04N 21/81 | (2011.01) |
| H04W 4/02 | (2018.01) |
| G01M 99/00 | (2011.01) |
| E03F 5/10 | (2006.01) |
| G06Q 10/00 | (2012.01) |
| H04L 12/28 | (2006.01) |
| F24F 11/30 | (2018.01) |

(52) U.S. Cl.
CPC .......... *F04D 15/0218* (2013.01); *F24F 11/30* (2018.01); *G05D 9/12* (2013.01); *G05D 23/1927* (2013.01); *G06Q 10/20* (2013.01); *G08B 21/00* (2013.01); *H04L 12/2803* (2013.01); *H04N 21/8126* (2013.01); *G05B 2219/163* (2013.01); *H04W 4/02* (2013.01)

(58) Field of Classification Search
CPC    F04D 15/0218; F04D 15/00; G05B 2219/163
USPC ......................................................... 702/114
See application file for complete search history.

(56) References Cited

U.S. PATENT DOCUMENTS

| | | | | |
|---|---|---|---|---|
| 9,399,526 | B2* | 7/2016 | Cheriere | B64F 5/40 |
| 9,638,436 | B2* | 5/2017 | Arensmeier | G05B 15/02 |
| 9,926,875 | B2* | 3/2018 | Dudar | G07C 5/008 |
| 9,933,338 | B2* | 4/2018 | Noda | G05B 23/024 |
| 10,171,892 | B2* | 1/2019 | Petrachek | G01F 23/30 |
| 10,385,795 | B2* | 8/2019 | Dudar | F02D 41/222 |
| 10,585,011 | B2* | 3/2020 | Banta | F04F 1/18 |
| 10,626,873 | B2* | 4/2020 | Hussain | F04D 13/086 |
| 10,711,788 | B2* | 7/2020 | Mayleben | F04D 13/086 |
| 2005/0062600 | A1* | 3/2005 | Olsen | F25D 29/008 340/506 |
| 2007/0260570 | A1* | 11/2007 | Hinchey | G08B 17/10 706/47 |
| 2009/0222220 | A1* | 9/2009 | Wilke | F16K 37/0091 702/34 |
| 2009/0271150 | A1* | 10/2009 | Stluka | G05B 23/0232 702/182 |
| 2010/0268391 | A1* | 10/2010 | Anderson | A01G 25/167 700/284 |
| 2010/0268562 | A1* | 10/2010 | Anderson | A01G 25/167 705/7.25 |
| 2010/0268679 | A1* | 10/2010 | Anderson | G06N 5/02 706/46 |
| 2011/0077875 | A1* | 3/2011 | Tran | E03F 5/22 702/45 |
| 2011/0178963 | A1* | 7/2011 | Hartman | G05B 23/0221 706/12 |
| 2012/0296486 | A1* | 11/2012 | Marriam | G05B 15/02 700/296 |
| 2013/0274992 | A1* | 10/2013 | Cheriere | B64F 5/40 701/32.9 |
| 2014/0266755 | A1* | 9/2014 | Arensmeier | G05B 15/02 340/679 |
| 2015/0143897 | A1* | 5/2015 | Cummings | H02J 9/062 73/168 |
| 2016/0076226 | A1* | 3/2016 | Edara | G01M 99/005 701/25 |
| 2016/0333884 | A1* | 11/2016 | Hussain | F04D 15/0088 |
| 2016/0371137 | A1* | 12/2016 | Zhao | G06F 17/175 |
| 2017/0342931 | A1* | 11/2017 | Dudar | F02D 41/222 |
| 2018/0017459 | A1* | 1/2018 | Banta | F04B 51/00 |
| 2018/0054662 | A1* | 2/2018 | Petrachek | G01F 23/30 |
| 2018/0150510 | A1* | 5/2018 | Tanaka | G06F 16/24534 |
| 2018/0180440 | A1* | 6/2018 | Masuda | G01W 1/18 |
| 2018/0209368 | A1* | 7/2018 | Dudar | F02D 41/222 |
| 2020/0209092 | A1* | 7/2020 | Banta | G01L 19/12 |
| 2020/0248698 | A1* | 8/2020 | Hussain | F04D 15/0236 |

OTHER PUBLICATIONS

J. S. Horsburgh and et al, "A relational model for environmental and water resources data", Water Resources Research, vol. 44, W05406, doi:10.1029/2007WR006392, 2008 (Year: 2008).*

J.-F. Cretaux and et al, "SOLS: A lake database to monitor in the Near Real Time water level and storage variations from remote sensing data", Advances in Space Research 47 (2011) 1497-1507, Available online Jan. 11, 2011) (Year: 2011).*

* cited by examiner

SYSTEM FOR ABNORMAL CONDITION DETECTION USING NEAREST NEIGHBOR

BACKGROUND

People have many different types of mechanical devices in their homes and businesses. For example, home owners may have sump pumps for pumping water out of the basement, furnaces for heating the home or business, air conditioners, and the like. Each of these mechanical devices has a specific mechanical function that may be critical to the home or business. As an example, a furnace for heating the home during cold winter days is critical for preventing pipes and people from freezing. As another example, a sump pump for pumping water from a basement is critical to prevent the basement from flooding during heavy downpours. These devices typically fail during use, and, as such, fail when they are needed the most. Repairing devices under such conditions can be very costly, because it requires an emergency repairman visit.

BRIEF SUMMARY

In summary, one aspect provides a method, comprising: receiving, from at least one sensor operatively coupled to a mechanical device, sensor data corresponding to a function of the mechanical device; accessing, from an environmental database, information regarding at least one environmental condition in proximity to a geographical location of the mechanical device; generating, using a processor, a correlative value for the mechanical device, wherein the correlative value identifies a correlation between the sensor data corresponding to a function of the mechanical device and the at least one environmental condition; assigning the correlative value as a baseline correlative value to the mechanical device; monitoring the sensor data corresponding to a function of the mechanical device and the at least one environmental condition and updating the correlative value; identifying, using a processor, the correlative value for the mechanical device has exceeded a predetermined threshold as compared to the baseline correlative value; and notifying a user that the correlative value for the mechanical device has exceeded the predetermined threshold.

Another aspect provides an information handling device, comprising: a processor; a memory device that stores instructions executable by the processor to: receive, from at least one sensor operatively coupled to a mechanical device, sensor data corresponding to a function of the mechanical device; access, from an environmental database, information regarding at least one environmental condition in proximity to a geographical location of the mechanical device; generate, using a processor, a correlative value for the mechanical device, wherein the correlative value identifies a correlation between the sensor data corresponding to a function of the mechanical device and the at least one environmental condition; assign the correlative value as a baseline correlative value to the mechanical device; monitor the sensor data corresponding to a function of the mechanical device and the at least one environmental condition and updating the correlative value; identify, using a processor, the correlative value for the mechanical device has exceeded a predetermined threshold as compared to the baseline correlative value; and notify a user that the correlative value for the mechanical device has exceeded the predetermined threshold.

A further aspect provides a method, comprising: receiving, from at least one sensor operatively coupled to a sump pump, sensor data corresponding to a water level of a sump pit co-located with the sump pump; accessing, from a water table database, information regarding a water table level located in proximity to a geographical location of the sump pump; generating, using a processor, a correlative value for the sump pump, wherein the correlative value identifies a correlation between the sensor data and the water table level; assigning the correlative value as a baseline value to the sump pump; monitoring the sensor data and the water table level and updating the correlative value; identifying the correlative value for the sump pump has exceeded a predetermined threshold as compared to the baseline correlative value; and notifying a user that the correlative value for the sump pump has exceeded the predetermined threshold.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
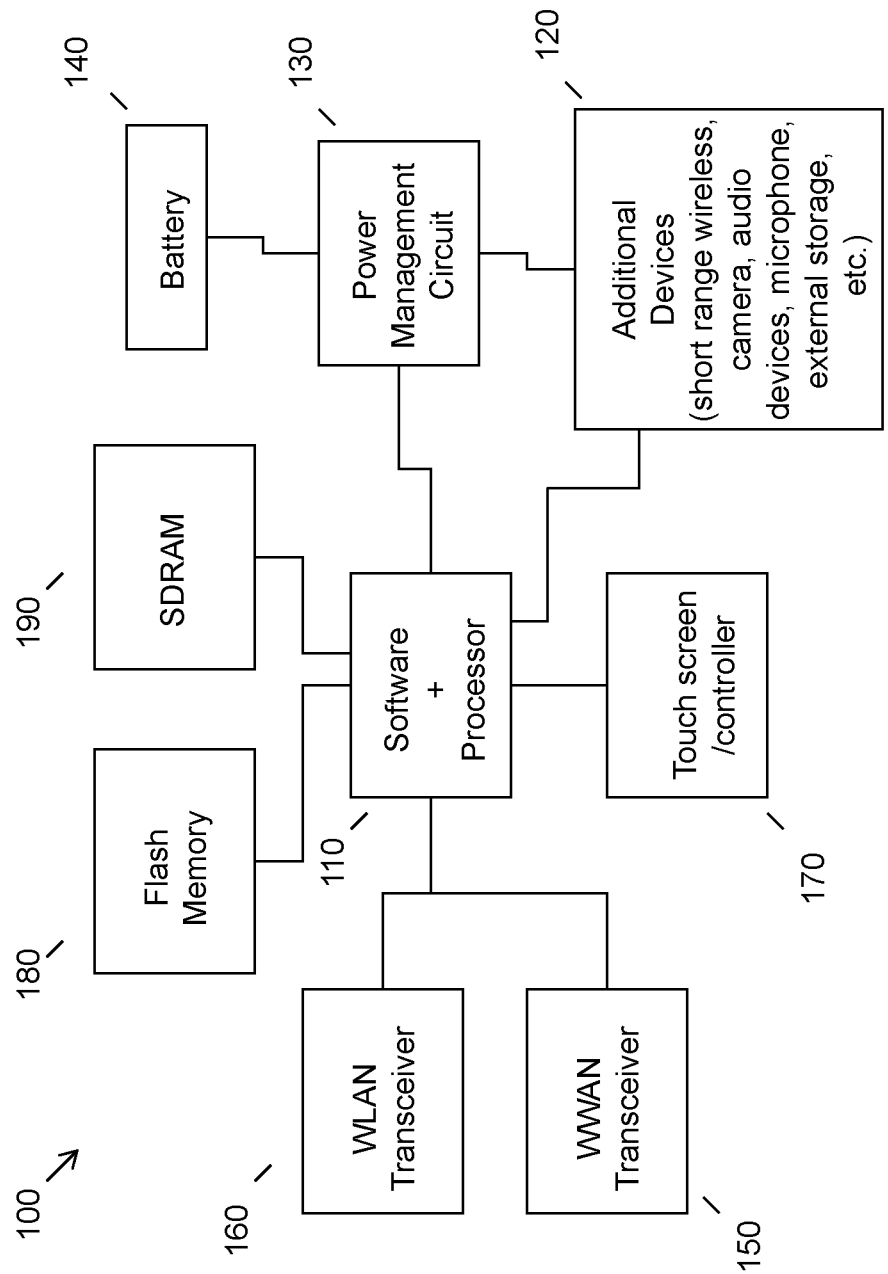
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Identifying when a device is going to fail is very difficult. Generally devices have a particular lifespan and the user can choose to replace it at or near the end of the lifespan or wait until the device fails. However, until the end of the lifespan of the device different parts and pieces on the mechanical device can fail due to different causes. For example, parts may wear out and fail due to extended use. As another example, parts may malfunction due to foreign objects getting into the device and causing the device to work incorrectly, thereby breaking parts. Different failures can cause the device to work differently than expected. For example, if a pump is working harder to pump water, it may draw more current or electricity than under normal operating conditions. As another example, if a foreign object gets lodged in a pump valve, the pump may not expel as much water as under normal operating conditions.

To identify the cause of failures, different information needs to be collected, for example, current draw, inflow, outflow, cycle times, and the like. With additional information this information could be used to detect when the device is about to fail or is starting to fail. However, most devices do not have the ability to capture this information. Generally any devices that have the ability to capture this information are those devices used in corporate facilities (e.g., power generation facilities, manufacturing facilities, production facilities, etc.). These devices are typically very large and critical to operating facilities that generate large amounts of products and money. Therefore, connecting sensors to the devices can be cost effective in these facilities. However, even if the device has the ability to capture this information, this information is not typically analyzed to determine if the device is starting to fail. Rather, the information is used to detect a failure as quickly as possible after the failure. To prevent failures or to extend device life in these facilities preventative maintenance is typically performed at regular intervals.

These technical issues present problems for home consumers, small business owners, small city facilities and the like, in that detecting and preventing costly failures of critical devices may be difficult. The consumer of small mechanical devices does not have a method for detecting when a device is not performing as expected, as these devices do not generally include sensors for monitoring different operating parameters of the devices. Additionally, even if the devices did have different sensors, the consumer could not analyze the information obtained to determine if or when the device is going to fail. Therefore, the consumer generally waits until the device fails which results in high repair or replacement costs. Additionally, the failure of the device can cause damage to the home or business (e.g., flooded areas, broken pipes, overheated equipment, etc.) which results in additional costs to fix the damage.

Accordingly, an embodiment provides a method of detecting an abnormal condition of a device, where the abnormal condition may be an indicator that the device is starting to fail. Starting to fail may include the device starting to work less efficiently than designed. For example, a device is expected to perform at a particular level. As the device is used and starts to wear, the performance level of the device may decrease. This performance level generally follows a particular performance curve. At a particular point on the performance curve the performance of the device is at a level where the failure of the device is imminent. However, knowing when the device is at this performance point is difficult without sensor information for the particular device.

Accordingly, an embodiment receives sensor data from one or more sensors operatively coupled the mechanical device. The sensor data may provide information regarding a characteristic related to a mechanical function of the device. For example, for a sump pump, the sensor data may provide an indication of a water level in a sump pit.

The system and method as described herein are more complex than a simple device connected to another device, for example, a thermostat connected to a furnace or air conditioning system. Using the example of the thermostat, this simple device merely reads an environmental or device value, for example, ambient temperature or the status of the device (i.e., on or off), and takes an action (i.e., sending a signal to turn the device on or off). In contrast, the system and method as described herein obtain a plurality of sensor data of both environmental conditions (e.g., geographical environmental conditions, outside air temperature, etc.) and device conditions to correlate the target device with a similar device located in a different location (e.g., a neighbor's house, another municipality, etc.). Using this correlation, the system and method as described herein can identify when one device is not functioning in a similar manner to another "neighbor" device. Upon this identification, the system can identify which device is functioning outside the expected parameters and notify a user of the device operating outside of the expected parameters, possibly including a potential cause of the malfunction and an expected time to failure.

An embodiment may also obtain additional information associated with an operating parameter of the mechanical device. For example, the system may obtain information related to a mechanical parameter (e.g., flow rate, inflow, outflow, valve position, etc.), operating environment parameter (e.g., temperature, humidity, etc.), electrical parameter (e.g., current draw, voltage draw, cycle time, etc.), and the like. An embodiment may then analyze the sensor data and the additional information by comparing the sensor data and additional information to previously stored data correlated to previously stored additional information. For example, an embodiment may identify that at a particular operating temperature, the sensor data should be a particular value. Previously stored data and additional information may include baseline information for the device. For example, expected operating parameters when particular conditions are met may be provided at a point of manufacturing. Previously stored data and additional information may also include historical data and information. For example, as the device operates, the operating information, including the sensor data and additional information, may be stored for comparison at a later time.

Based upon the analysis, an embodiment may identify an abnormal operating condition. An abnormal operating condition does not only include a complete failure of the device. Rather, the abnormal operating condition may include an operating condition that is outside a predetermined or particular threshold. For example, using the performance curve, an abnormal operating condition may be identified when the performance level of the device is at 60% of the optimal operating performance. A user may then be notified of the abnormal operating condition. In one embodiment, the notification may also include an estimation of when the device will completely fail. For example, based upon the abnormal condition, the system may determine that the device will fail within a particular time frame (e.g., months, days, device cycles, etc.). The system may also identify the type of failure (e.g., a particular part, the whole device, etc.). Such a system allows a user to schedule a time for repair or replacement of the device which will not result in an emergency repair visit.

Additionally, the user is provided with a type of failure which can allow the user to decide whether to replace a part/device, repair the device/part, or the like.

To more accurately determine a failure or expected failure, it is beneficial to compare one device's operating parameters to environmental conditions and/or other devices having similar characteristics. This allows a system to identify whether the device is failing, or whether the environmental conditions are above an expected level that the device cannot handle. For example, a furnace in a warmer climate may not be rated to warm a house of a particular size if the outside temperature is below a particular value. However, a house having the same characteristics but in a colder climate may require a furnace rated for lower environmental temperatures. Thus, if the outside temperature in the warmer climate drops below the rated temperature, the furnace may not run effectively even though the furnace is in perfect working condition. Therefore, an embodiment provides a method of detecting an abnormal operating condition of a device while taking into account environmental conditions and/or other devices having similar characteristics.

This system may receive sensor data corresponding to a function of the mechanical device. Additionally, the system may access information regarding at least one environmental condition in proximity to a geographical location of the mechanical device. For example, the system may access a database having water table levels, environmental temperatures, weather conditions, and the like. One embodiment may also access a database including information related to similar mechanical devices. For example, the neighbor database may include information related to sump pumps having similar characteristics (e.g., size, operating parameters, expected values, etc.) to the mechanical device of interest.

The system may generate a correlative value for the mechanical device that identifies a correlation between the sensor data and the environmental condition. Using the example of a sump pump, the system may determine a correlation between the water level in the sump pump pit and the water table level around the geographical location of the sump pump. The system may assign the correlative value as a baseline correlative value to the mechanical device. The system then monitors the sensor data and the environmental condition and updates the correlative value. This updated correlative value is then compared to the baseline correlative value. If the updated correlative value exceeds a predetermined threshold, the system may notify the user of such. Such an analysis assists in identifying when the mechanical device is starting to fail.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
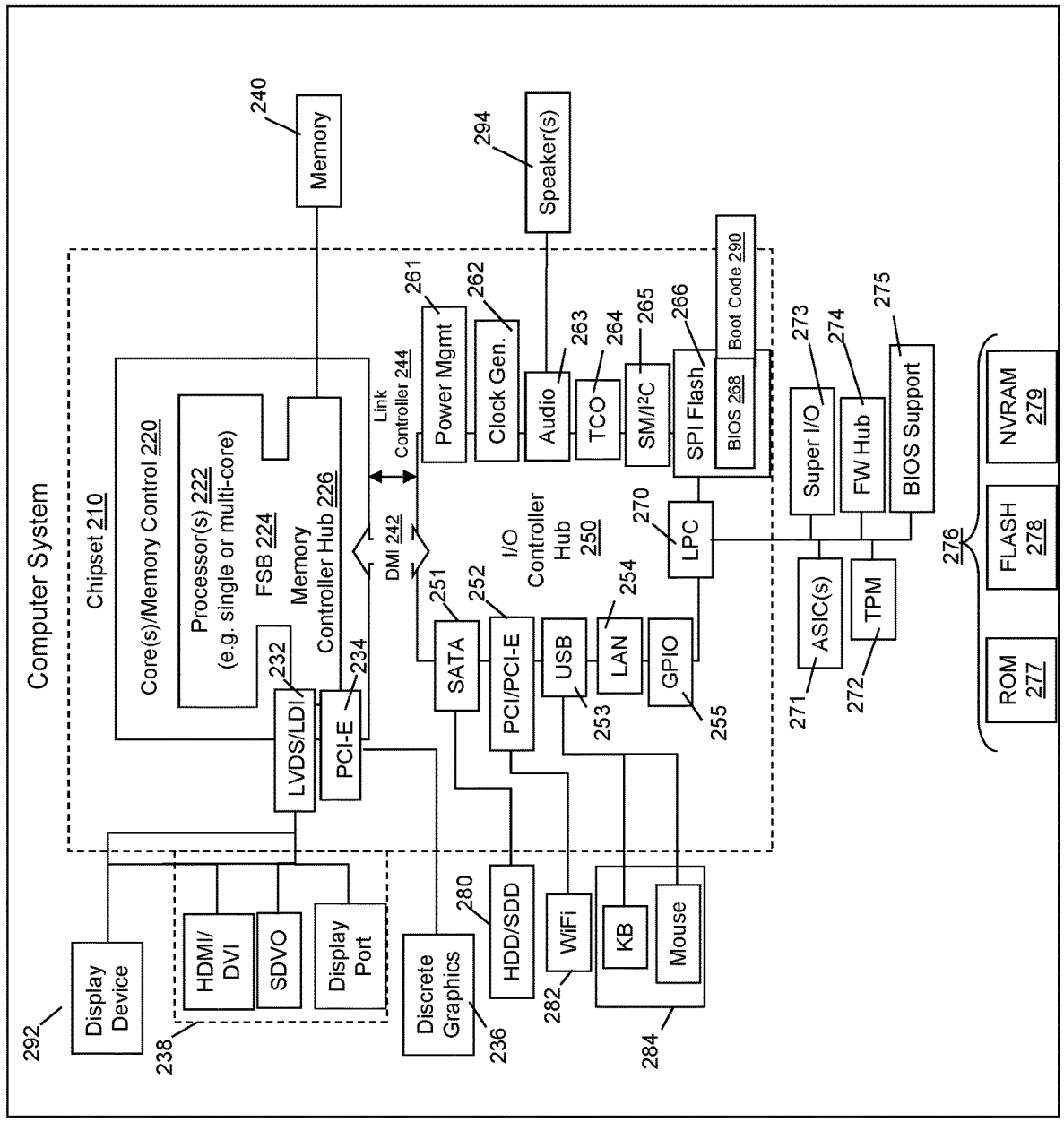
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to receive alerts or notifications of abnormal conditions for the mechanical device. Additionally, such devices may be used by an embodiment to capture, obtain, receive, and/or analyze data and information from the mechanical device or databases. For example, the circuitry outlined in FIG. 1 may be implemented in a tablet or smart phone embodiment, whereas the circuitry outlined in FIG. 2 may be implemented in a personal computer embodiment.

Figure 3:
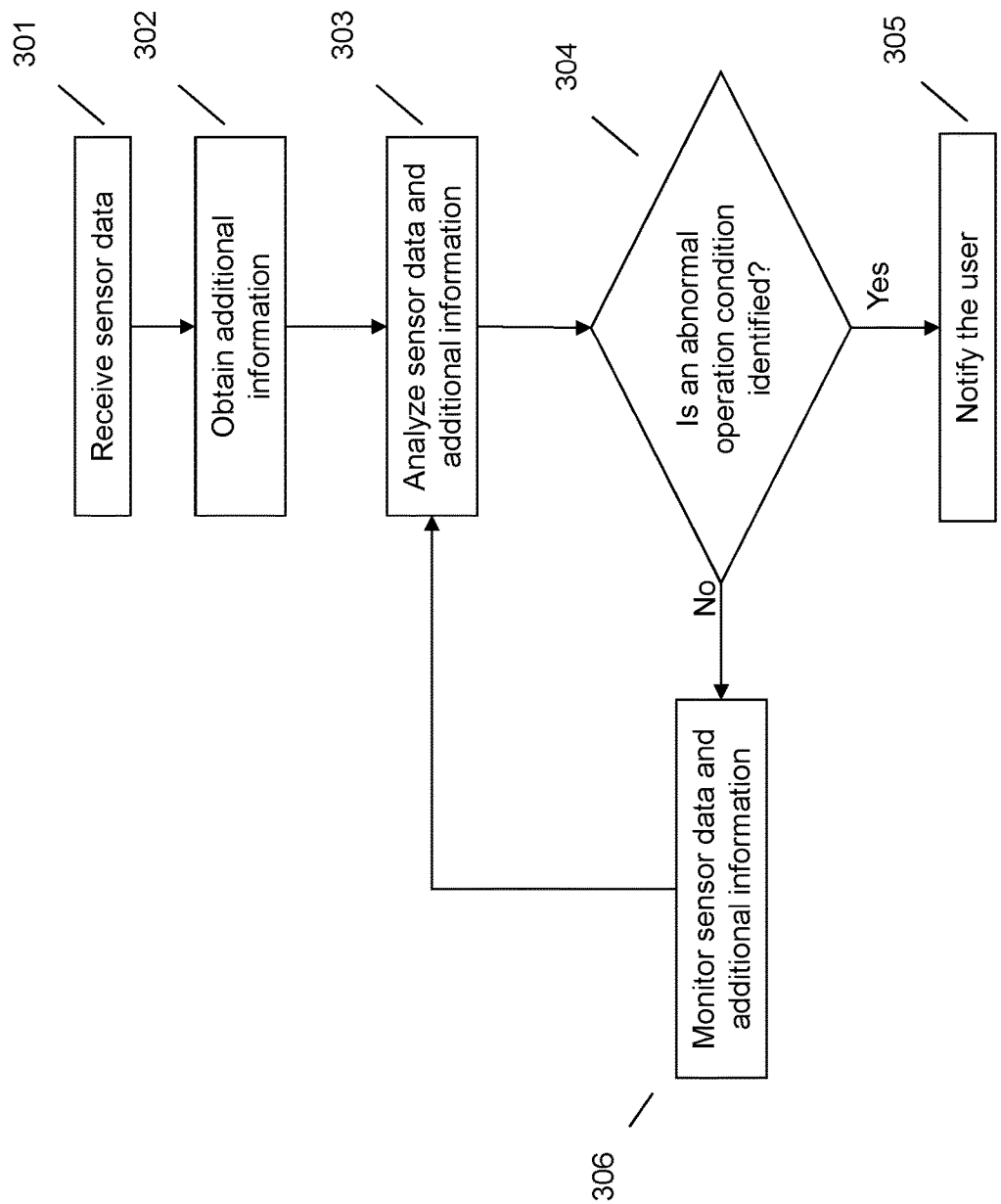
FIG. 3 illustrates an example method of abnormal condition detection by a mechanical device.

Referring now to FIG. 3, at 301, an embodiment may receive sensor data from one or more sensors operatively coupled to a mechanical device. The mechanical device may be any device which is intended to perform some mechanical function, for example, a furnace, air conditioner, sump pump, fan, water heater, and the like. For ease of understanding, the example of a sump pump and sump pump pit will be used throughout this document. However, the techniques and systems and described throughout can be used for any type of mechanical device and/or mechanical system (e.g., heating system, cooling system, exhaust system, etc.).

The sensor may be directly connected to the device, for example, integral to the device, attached to the device via a mechanical or electrical connection, and the like, or may be connected to the device through a third device, for example, the sensor is connected to an information capture system which is in communication with the mechanical device. In one embodiment the sensor may be easily installed and replaced by a consumer. For example, the device may include a connection port for the sensor. A user may then just connect the sensor and/or probe to the device. The ability for the user to quickly connect or disconnect the sensor allows a user to replace the sensor when the sensor has worn out, without having to disassemble or discard the mechanical device itself. For example, sensors located in harsh environments may need to be replaced before the mechanical device would require replacement or repair.

The sensor data may provide information regarding a characteristic related to a mechanical function of the device. The mechanical function of the device may include the function that the device is intended to do. For example, using the sump pump example, the mechanical function may include pumping water. Other examples of mechanical functions may include heating performed by a furnace, cooling performed by an air conditioner, circulating air performed by a fan, and the like. Thus, the characteristic related to the mechanical function may include some indication of whether the device should be performing the mechanical function. Using the sump pump example, the sensor data may include an indication of the water level in the sump pump pit. Other examples include air temperature, humidity level, air flow, and the like. The sensor data may include other information related to the mechanical function. For example, the sump pump pit may have more than one sensor, for example, a low water level sensor that engages or disengages the pump and a high level sensor that increases the flow rate of the pump.

At 302 an embodiment may obtain additional information associated with an operating parameter of the device. The additional information may include electrical information (e.g., current, voltage, electrical frequency, etc.), mechanical information (e.g., flow rate, pump rate, valve information, etc.), operating environment information (e.g., air temperature, humidity, etc.), and the like, associated with an operating parameter of the device. Operating parameters of the device may include air/water flow rate, electrical draw, electrical current draw, device temperature, valve sensors, and the like. Thus, the additional information may include any information related to these operating parameters. For example, the information may include an indication of if a valve is open or closed, a reading of the flow rate, and the like. In one embodiment, the additional information may identify a specific value associated with an operating parameter of the device, for example, 8 psi (pounds per square inch), 12 gpm (gallons per minute), and the like. Alternatively, the additional information may indicate that the operating parameter is not as expected, for example, the flow rate is low, a valve has failed to open, and the like.

At 303 an embodiment may analyze the sensor data and the additional information. Analysis of the sensor data and the additional information may be used to determine whether the device is operating as expected. Thus, analyzing the sensor data and the additional information may include comparing the sensor data and the additional information to previously stored sensor data correlated to previously stored additional information. The previously stored sensor data and additional information may include baseline information which may represent a normal or expected operating condition of the device. The baseline or expected operating condition information may be programmed into the device or a memory device accessible by the system. The previously stored sensor data and additional information may additionally, or alternatively, include historical information regarding previous performance of the device. Thus, as the device is operating, the system may capture information and store the information in a database for later comparisons.

To make the comparison, the received sensor data and additional information may be correlated with each other. The correlation may include making an identification of what the sensor data indicates as compared to what the additional information should be or indicates. As an example, the system may identify that the sensor data indicates the water level of the sump pump is at a level that the pump should be running. The system may then identify what the operating parameters should be when the pump is running. As an example, the system may identify that the pump outflow should be 5 gpm. Thus, the additional information (e.g., the outflow value in this example) should be 5 gpm. As can be understood by one skilled in the art, the operating parameters may include one or multiple parameters that can be compared. The expected operating parameters may not be a specific number, but, rather, may include a range. Thus, as long as the operating parameters are within the range, the device is considered operating as expected.

In the case where historical information is captured and stored, the comparison may be made against the baseline information or against the historical information. For example, as the device is used the performance level of the device degrades. Thus, as compared to the baseline information the operating parameters of the device may be outside the threshold, but as compared to the historical information the operating parameters may be within the expected values. In the case of comparing to historical information, the system may identify that the operating parameters are outside a predetermined threshold by identifying that the operating parameters have changed beyond a particular threshold rate. For example, the historical rate of change of the performance level may be a decrease of performance by 1% per month. The system may identify this rate of change as acceptable. However, if the performance level of the device decreases by 5% in a single month, such a decrease may be outside an acceptable rate of change. Thus, the threshold may include a rate of change threshold.

The analysis may also be used to identify a timeframe associated with failure. As an example, when a mechanical device starts to fail, the performance level tends to decrease rapidly, for example, exponentially. The point of beginning the exponential decrease in performance rate may indicate that the device is starting to fail. Using different methods, the time until complete failure can be determined or estimated. For example, in one method the system may estimate the time of failure by calculating the time to failure based upon the exponential performance degradation. As another example, using mechanical device performance charts having known device failure points, the estimated time to failure can be determined. The estimated time to failure may also be identified based upon known conditions. For example, the system may have previously identified failures and the operating parameters and sensor data associated with those failures. The system may also know how long the devices performed under those conditions and may then identify that time as an estimated time to failure.

The system may also identify the type of failure that the mechanical device is experiencing. To determine the type of failure, the system may use the correlated sensor data and additional information. Different failures will result in different operating parameter information and sensor data. For example, when a sump pump is experiencing a valve blockage, the system may experience different operating parameter values than when the sump pump is experiencing electrical failure. Thus, using the correlation between the sensor data and additional information, the system may determine the type of failure, the part that is failing, and the like. This information may also be used to determine how long until complete failure.

At 304 an embodiment may identify whether the device is experience or operating within an abnormal operating condition. The determination of whether the device is within an abnormal operating condition may be based upon the analysis performed at 303. If the operating parameters are determined to be outside the predetermined threshold, the system may identify that the device is operating within an abnormal operating condition. Thus, an abnormal condition may be identified if the sensor data correlated with the additional information is outside a predetermined threshold as compared to the baseline data. An abnormal condition may also be identified if the sensor data correlated with the additional information is outside a predetermined threshold as compared to the historical operating information. As discussed before, the abnormal operating condition may not only be a complete failure of the device, but may also include a beginning of a failure, an unexpected operating condition, and the like. If an abnormal operating condition is not identified at 304, the system may continue to monitor the sensor data and additional information at 306.

If, however, an abnormal operating condition is identified at 304, an embodiment may notify a user of the abnormal operating condition at 305. Notifying the user may be as simple as providing an indication on the device (e.g., a light, an alarm, etc.) that indicates the device is not performing as expected. Notifying the user may include sending a notification to a user on a device associated with the user. For example, the system may be connected to a network and can then notify the user of the abnormal condition using another device on the network, for example, the user's mobile phone, laptop computer, tablet, smart watch, and the like. The notification may also identify the type of failure that the mechanical device is experiencing. Additionally, depending on the failure, the system may be able to provide troubleshooting instructions to a user to assist in fixing a problem. For example, if the system determines, based upon the analysis, that the inflow is lower than expected, the system may identify one of the causes as being a blocked inlet and may provide instructions to the user for checking for a blocked inlet.

Figure 4:
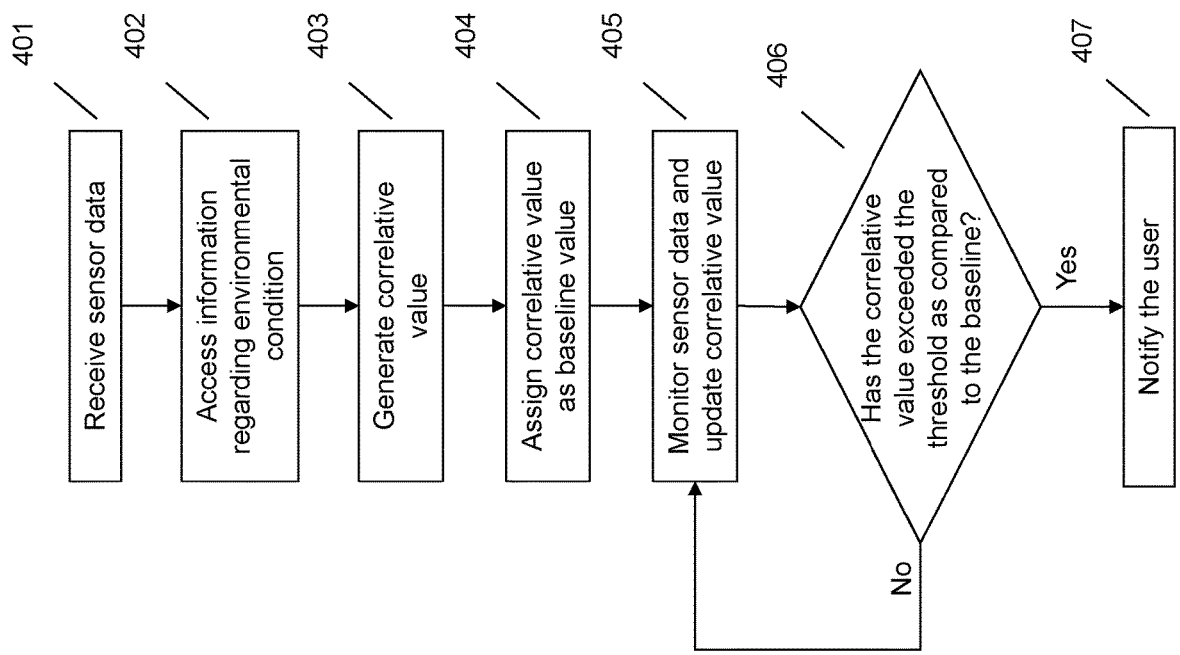
FIG. 4 illustrates an example method of abnormal condition detection using environmental condition information.

The system as described above may be interconnected to a network which includes additional information regarding environmental conditions within a particular geography. Such a network may provide more accurate information regarding possible failures, times to failures, and the like. Referring now to FIG. 4, the system may receive sensor data at 401. This sensor data may be similar to the sensor data as discussed in connection with 301 of FIG. 3. The system may also receive additional information related to the operating parameters of the device. In addition, the system may also identify or include other characteristics associated with the device, for example, the type of device (e.g., pump, fan, furnace, etc.), the manufacturer of the device, the model of the device, geographical location, and/or the like.

At 402, the system may access an environmental database that includes environmental conditions in proximity to a geographical location of the mechanical device. Environmental conditions may include conditions which are germane to the geographical location of the device and to the type of device itself. For example, the database may include water table levels for different geographical locations, outside air temperature, outside humidity, climate type, terrain types, weather conditions, and the like. Different environmental conditions may have different effects on different types of devices. For example, water table levels may have an effect on a sump pump, but not on an exhaust fan.

At 403 an embodiment may generate a correlative value for the mechanical device. The correlative value may identify a correlation between the sensor data and the environmental condition. As an example, using the sump pump, the system may identify a water level of the sump pump pit and correlate this value to a water table level of the environment surrounding the location of the sump pump. The correlative value can then be assigned as a baseline correlative value to the mechanical device at 404. The system may monitor the sensor data and then environmental condition and update the correlative value as the sensor data and environmental conditions change. Using the sump pump example, the system monitors the water level in the sump pump pit and the water table level and determines the correlative value between the sump pump pit and the water table level. This acts as a baseline value for the pump and water table level.

The correlative value, sensor data, and environmental condition may also be compared with similar mechanical devices under similar conditions. The system may include a neighbor database which includes information related to other mechanical devices having similar characteristics to the device of interest (e.g., same device type, similar manufacturer, similar date of installation, similar operating conditions, similar environmental conditions, etc.). The neighbor database may also include sensor data, environment conditions, and baseline or updating correlative values associated with the similar mechanical devices. In one embodiment, the baseline correlative value and environment condition may be used to identify similar devices. For example, the system may assign a device as similar solely based upon device type, environment condition, and correlative value regardless of the other characteristics of the devices.

At 406, the system may identify if the correlative value has exceeded a predetermined threshold as compared to the baseline value. Using the example above, if, while monitoring the correlative value, the value exceeds a predetermined value as compared to the baseline correlative values, it can be determined that the pump is not working as efficiently as it has previously performed. Thus, the system can determine that the performance level has decreased.

The correlative value and/or sensor data may also be compared to the correlative values and/or sensor data of the neighbor devices, as explained in more detail below. This comparison may provide a more accurate identification of whether the device is failing. For example, if neighbor devices also have correlative values which have exceeded the threshold as compared to the baseline value, the system may determine that the device is not failing, but, rather an environmental condition is causing the degradation in performance. On the other hand, even if the correlative value has not exceeded the threshold, the system may identify that the device is starting to fail because the performance of the device does not match the performance of the neighbor devices. As another example, if the sensor data for a device having a similar correlative value is different from the sensor data of the device of interest, the system may identify the discrepancy. Based upon this discrepancy, the system may identify that the device of interest is starting to fail. The discrepancy may also be used to more accurately identify the type of failure (e.g., the part that is failing, the cause of the failure, etc.).

If the correlative value has not exceeded the predetermined threshold, the system may continue to monitor the sensor data and the environmental condition. If, however, the correlative value has exceeded the predetermined threshold, the system may notify the user at 407. The notification can be performed using a method as described above in connection to 305 of FIG. 3. Additionally, the system, using similar methods to those described above, may identify the time to failure, the type of failure, and the like. Additionally, the system may compare the information to information captured from neighbor devices to more accurately identify the time to failure, type of failure, and the like.

Figure 5:
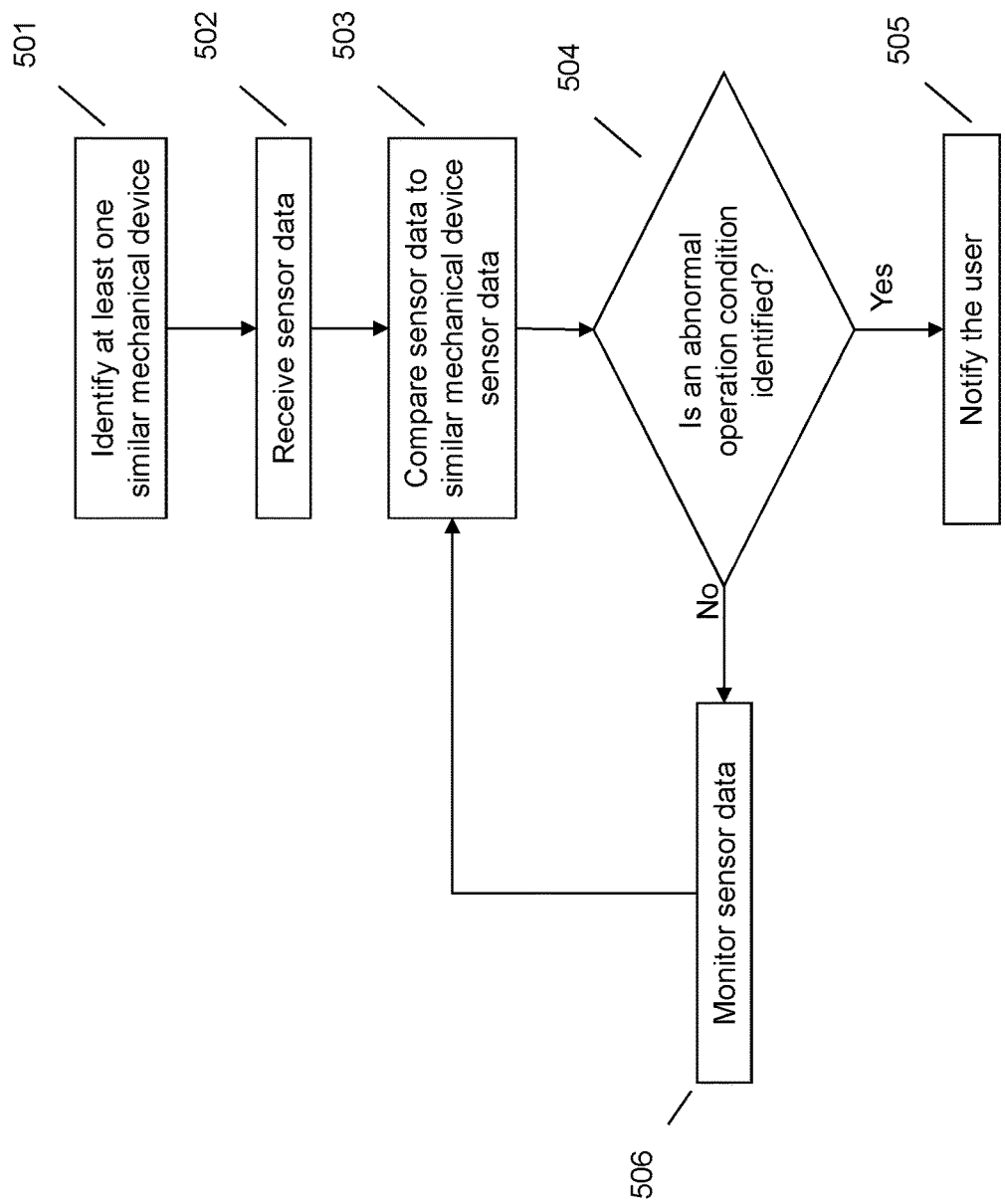
FIG. 5 illustrates an example method of abnormal condition detection using a nearest neighbor.

FIG. 5 illustrates a method for identifying an abnormal condition based upon comparison with a neighboring device. At 501, an embodiment may identify at least one similar mechanical device from a plurality of candidate mechanical devices. As can be understood, more than one similar device may be identified. The plurality of candidate mechanical devices may, for example, be stored in a database, list, cloud device, or the like. In one embodiment, the identification may be based upon the correlative value as described above. As a brief example, the correlative value may be based upon a correlation between the sensor data of the mechanical device and an operating parameter of the device. For example, the sensor data may indicate that a radon system has a particular flow rate. An operating parameter of the radon system may identify the value of the radon in the environment where the radon pump is located. Based upon the sensor data and the operating parameter, a correlative value may be assigned to the device. A similar device may then be a device having the same or a similar correlative value as the target mechanical device. A similar correlative value may be considered a value within a particular threshold or range as compared to the target correlative value. This threshold or range may be a default value or range, or may, alternatively, be provided by a user, or a combination thereof.

Identifying a similar mechanical device may include comparing information related to the device to other devices in the candidate device list. For example, the additional information (e.g., model, serial number, manufacturer, manufacture date, installation date, etc.) as discussed above, may be used to identify devices having similar characteristics to the target mechanical device. Additionally, the identification of a similar mechanical device may be based upon geographical information related to a location of the mechanical device. For example, the system may identify devices which are in environments having similar geographical features to the target device. As an example, the system may associate devices which are in environments having the same water table level, humidity level, terrain features, weather features, and the like.

To be identified as a similar device, the similar device does not have to have exact matching characteristics and geographical information as the target device. Rather, the similar device may only include a subset of matching characteristics or geographical features. For example, the type of device, date of installation, and surrounding water table level may be the same, but the model of device, manufacturer, and humidity level are different. The system may also include a ranking of the features which should be prioritized when identifying a similar mechanical device. For example, the geographical information may be of a higher priority than characteristic data. Additionally, particular information may have a higher ranking than other information. For example, water table level may have a higher ranking than terrain features. Based on the ranking of the information, the devices may or may not be identified as similar. Thus, devices having the same or substantially the same characteristics may be identified as unsimilar based upon different geographical information. As should be understood by one skilled in the art, these are merely examples of information rankings. Other rankings are possible and contemplated, for example, device characteristics may be higher ranking than geographical information, or some device characteristics are higher ranking than some geographical information.

At 502, the system may receive sensor data from a sensor operatively coupled to the mechanical device. The sensor data may be similar as that described in connection with 301 of FIG. 3. The sensor data may also include data related to an operating parameter of the mechanical device, for example, as described in connection with 302 of FIG. 3. At 503, the system may compare the sensor data of the mechanical device to sensor data of the at least one similar mechanical device. The sensor data of the at least one similar mechanical device may be included with the candidate device list. Alternatively, the system may query the similar mechanical device for the sensor data when a comparison is needed.

Based upon the comparison at 503, an embodiment may identify if an abnormal operation condition exists for the target mechanical device at 504. Identifying an abnormal operating condition may include comparing the sensor data, operating parameters, and/or geographical information (collectively "condition information" for ease of understanding and readability) of the target device to the condition information of one or more similar devices. If the comparison of the condition information identifies that the condition information of the target device is outside a predetermined range or threshold as compared to the one or more similar devices, the system may identify the target device as experiencing an abnormal condition. For example, if a target furnace is cycling once every 15 minutes, and two identified similar devices are cycling once every 30 minutes, the system may identify the target furnace is experiencing an abnormal operating condition. Thus, the system may use information captured from neighboring devices (i.e., identified similar devices) to identify abnormal conditions of a target device.

If no abnormal condition exists, the system may monitor the sensor data at 506. If, however, an abnormal condition is identified, the system may notify a user at 505. Notification of the user may occur as described in connection with 305 of FIG. 3 and/or 407 of FIG. 4. In addition, as also discussed in connection with 305 of FIG. 3 and/or 407 of FIG. 4, the system may determine a cause of the abnormal condition based upon the sensor data or other information. Additionally, the cause of the abnormal condition may be based upon causes of abnormal conditions of similar devices. For example, if a pump of a similar device has just been replaced due to end of life, the system may incorporate this information into the analysis of the cause of failure of the target device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for detecting an abnormal condition in a mechanical device, the method comprising:

receiving, by a system configured to monitor a performance of a plurality of mechanical devices that are configured to control an interior environment of a house, first sensor data from a first sensor operatively coupled to a first mechanical device of the plurality of mechanical devices, the first sensor data corresponding to functions of the first mechanical device, wherein the first sensor data corresponding to the functions of the first mechanical device comprise an electrical current draw of the first mechanical device and a cycle time of the first mechanical device, wherein the system comprises at least one processor operatively coupled to a memory;

receiving, by the system, second sensor data from a second sensor operatively coupled to a second mechanical device of the plurality of mechanical devices, the second sensor data corresponding to functions of the second mechanical device wherein the second sensor data corresponding to the functions of the second mechanical device comprise an electrical current draw of the second mechanical device and a cycle time of the second mechanical device;

accessing, by the system, information from an environmental database, wherein the information includes at least one environmental condition for a geographical location of the first mechanical device, wherein the at least one environmental condition for the geographical location of the first mechanical device comprises a type of climate of the geographical location of the first mechanical device;

accessing, by the system, information from the environmental database, wherein the information includes at least one environmental condition for a geographical location of the second mechanical device, wherein the at least one environmental condition for the geographical location of second mechanical device comprises a type of climate of the geographical location of the second mechanical device;

generating, using the at least one processor, a first correlative value for the first mechanical device, wherein the first correlative value identifies a correlation between a value of the first sensor data corresponding to the functions of the first mechanical device and the at least one environmental condition for the geographical location of the first mechanical device;

generating a second correlative value for the second mechanical device, wherein the second correlative value identifies a correlation between a value of the second sensor data corresponding to the functions of the second mechanical device and the at least one environmental condition for the geographical location of the second mechanical device;

determining whether the first mechanical device is a neighbor device to the second mechanical device,
  wherein the first mechanical device is a neighbor device to the second mechanical device when the second mechanical device is in a different location from the first mechanical device and the system assigns the second mechanical device as similar to the first mechanical device based on information in a neighbor database,
  wherein the information in the neighbor database includes:
    characteristics, wherein the characteristics comprise device type,
    environmental conditions, wherein the environmental conditions comprise geographical location, climate type, weather conditions, and water table levels, and
    correlative values;

in response to assigning the second mechanical device as similar to the first mechanical device, wherein the plurality of mechanical devices configured to control the environment of a house comprises any one or more of: a heating system, a cooling system, an exhaust system, a furnace, an air conditioning system, a sump pump, a pump, a fan, and an exhaust fan;

determining, by the system, whether the first mechanical device is functioning outside expected parameters for the first mechanical device based upon comparing the electrical current draw of the first mechanical device and the cycle time of the first mechanical device to the electrical current draw of the second mechanical device and the cycle time of the second mechanical device; and in response to determining that the first mechanical device is functioning outside the expected parameters, notifying, by the system, a user that the first mechanical device is functioning outside the expected parameters.

2. The method of claim 1, further comprising:
assigning the first correlative value as a baseline correlative value to the first mechanical device;
monitoring the first sensor data corresponding to the functions of the first mechanical device and the at least one environmental condition for the geographical location of the first mechanical device;
updating the first correlative value based upon:
  changes in the first sensor data identified from the monitoring of the first mechanical device, or
  changes in the at least one environmental condition for the geographical location of the first mechanical device;
identifying, using the at least one processor, whether the updated correlative value for the first mechanical device has exceeded a predetermined threshold as compared to the assigned baseline correlative value; and
in response to determining that the updated correlative value for the first mechanical device has exceeded the predetermined threshold as compared to the assigned baseline correlative value, notifying, using the at least one processor, the user that a performance of the first mechanical device has degraded.

3. The method of claim 2, further comprising:
determining whether the at least one environmental condition for the geographical location of the first mechanical device is changing, identified from the monitoring of the first mechanical device;
in response to determining that the at least one environmental condition for the geographical location of the first mechanical device is not changing, determining, by the at least one processor, that the updated correlative value for the first mechanical device has exceeded the threshold based on changes in the first sensor data.

4. The method of claim 1, wherein the at least one environmental condition for the geographical location of the first mechanical device further comprises one or more of a water table level, a type of terrain and weather conditions in proximity to the geographical location of the first mechanical device.

5. The method of claim 1, further comprising identifying a discrepancy between the first sensor data corresponding to the functions of the first mechanical device with the first sensor data corresponding to the functions of the neighbor device.

6. The method of claim 5, further comprising analyzing the first sensor data corresponding to the functions of the first mechanical device to determine a cause of the first mechanical device functioning outside the expected parameters.

7. The method of claim 6, wherein the analyzing comprises correlating the first sensor data corresponding to the functions of the first mechanical device with information related to known failure modes of the first mechanical device.

8. The method of claim 1, wherein the notifying the user comprises identifying an estimated time to failure of the first mechanical device.

9. The method of claim 1, wherein the first sensor data corresponding to a functions of the first mechanical device comprises data selected from the group consisting of: operating environment data, electrical data, and mechanical data.

10. An information handling device, comprising:
a processor;
a memory device that stores instructions executable by the processor to:
receive, from a first sensor operatively coupled to a first mechanical device, first sensor data corresponding to functions of the first mechanical device;
receive, from a second sensor operatively coupled to a second mechanical device, second sensor data corresponding to functions of the second mechanical device,
wherein the first mechanical device and the second mechanical device are configured to control the interior environment of a house, and
wherein the first sensor data corresponding to functions of the first mechanical device and the second sensor data corresponding to second mechanical device comprise electrical current draw and cycle time;
access, from an environmental database, information regarding at least one environmental condition for a geographical location of the first mechanical device, wherein the at least one environmental condition for the geographical location of the first mechanical device comprises a type of climate of the geographical location of the first mechanical device;
access, from the environmental database, information regarding at least one environmental condition for a geographical location of the second mechanical device, wherein the at least one environmental condition for the geographical location of the second mechanical device comprises a type of climate of the geographical location of the second mechanical device;
generate a first correlative value for the first mechanical device, wherein the first correlative value identifies a correlation between a value of the first sensor data corresponding to the functions of the first mechanical device and a value of the at least one environmental condition for the geographical location of the first mechanical device;
generate a second correlative value for the second mechanical device, wherein the correlative value identifies a correlation between a value of the second sensor data corresponding to the functions of the second mechanical device and the at least one environmental condition for the geographical location of the second mechanical device; and
determine whether the first mechanical device is a neighbor device to the second mechanical device,
wherein the first mechanical device is a neighbor device to the second mechanical device when the second mechanical device is in a different location from the first mechanical device and the processor assigns the second mechanical device as similar to the first mechanical device based on information in a neighbor database,
wherein the information in the neighbor database includes:
characteristics, wherein the characteristics comprise device type,
environmental conditions, wherein the environmental conditions comprise geographical location, climate type, weather conditions, and water table levels, and
correlative values;
in response to assigning the second mechanical device as similar to the first mechanical device, wherein the plurality of mechanical devices configured to control the environment of a house comprises any one or more of: a heating system, a cooling system, an exhaust system, a furnace, an air conditioning system, a sump pump, a pump, a fan, and an exhaust fan;
determine whether the first mechanical device is functioning outside expected parameters for the first mechanical device based upon comparing the first sensor data corresponding to the functions of the first mechanical device to the second sensor data corresponding to the functions of the neighbor device; and
notify a user that the first mechanical device is functioning outside the expected parameters.

11. The information handling device of claim 10, further comprising instructions executable by the processor to:
assign the first correlative value as a baseline correlative value to the first mechanical device;
monitor the first sensor data corresponding to the functions of the first mechanical device and the at least one environmental condition for the geographical location of the first mechanical device;
update the first correlative value based upon:
changes in the first sensor data identified from the monitoring of the first mechanical device, or
changes in the at least one environmental condition for the geographical location of the first mechanical device;
update whether the updated correlative value for the first mechanical device has exceeded a predetermined threshold as compared to the assigned baseline correlative value; and
in response to determining that the updated correlative value for the first mechanical device has exceeded the predetermined threshold as compared to the assigned baseline correlative value, notify the user that a performance of the first mechanical device has degraded.

12. The information handling device of claim 11, further comprising instructions executable by the processor to:
determine whether the at least one environmental condition for the geographical location of the first mechanical device is changing, identified from the monitoring of the first mechanical device;
in response to determining that the at least one environmental condition for the geographical location of the first mechanical device is not changing, determine that the updated correlative value for the first mechanical device has exceeded the threshold based on changes in the first sensor data.

13. The information handling device of claim 10, wherein the at least one environmental condition for the geographical location of the first mechanical device further comprises one or more of a water table level, a type of terrain and weather conditions in proximity to the geographical location of the first mechanical device.

14. The information handling device of claim 10, further comprising instructions executable by the processor to identify a discrepancy between the first sensor data corresponding to a functions of the first mechanical device with the first sensor data corresponding to the functions of the neighbor device.

15. The information handling device of claim 14, further comprising instructions executable by the processor to analyze the first sensor data corresponding to the functions of the first mechanical device to determine a cause of the first mechanical device functioning outside the expected parameters.

16. The information handling device of claim 15, wherein the instructions to analyze comprise instructions to correlate the first sensor data corresponding to the functions of the first mechanical device with information related to known failure modes of the first mechanical device.

17. The information handling device of claim 10, wherein the instructions to notify the user comprise instructions to identify an estimated time to failure of the first mechanical device.

18. A method, for detecting an abnormal condition in a mechanical device, the method comprising:
   receiving, by a system configured to monitor a performance of a plurality of mechanical devices, first sensor data from at least one sensor operatively coupled to a first sump pump, corresponding to both a water level of a first sump pit co-located with the first sump pump and electrical current draw of the first sump pump, wherein the system comprises a processor operatively coupled to a memory;
   accessing, by the system, information from a water table database, regarding a first water table level located in proximity to a geographical location of the first sump pump;
   generating, using the processor, a first correlative value for the first sump pump, wherein the correlative value identifies a correlation between a value of the first sensor data and the first water table level;
   receiving, by the system, second sensor data from at least one sensor operatively coupled to a second sump pump, corresponding to both a water level of a second sump pit co-located with the second sump pump and electrical current draw of the second sump pump;
   accessing, by the system, information from a water table database regarding a second water table level located in proximity to a geographical location of the second sump pump;
   generating, using the processor, a second correlative value for the second sump pump, wherein the correlative value identifies a correlation between a value of the second sensor data and the second water table level;
   determining whether the first sump pump is a neighbor device to the second sump pump,
      wherein the first sump pump is a neighbor device to the second sump, when the second sump pump is in a different location from the first sump pump and the system assigns the second sump pump as similar to the first sump pump based on information in a neighbor database,
      wherein the neighbor database includes information related to sump pumps having similar:
      characteristics, wherein characteristics comprise device type,
      environmental conditions, wherein environmental conditions comprise geographical location, climate type, weather conditions, and water table levels,
      correlative values;
   in response to assigning the second sump pump as similar to the first sump pump, determining that the second sump pump is a neighbor device to the first sump pump;
   determining whether the first sump pump is functioning outside expected parameters for the first sump pump based upon comparing the first sensor data corresponding to the first sump pump to the second sensor data corresponding to the second sump pump and
   notifying a user that the first sump pump is functioning outside expected parameters.

* * * * *